United States Patent
Cao (10) Patent No.: US 7,316,014 B2
(45) Date of Patent: Jan. 1, 2008

(54) APPLICATION MODIFICATION SYSTEM AND METHOD

(75) Inventor: Anthony Don Cao, Bothell, WA (US)

(73) Assignee: BSQUARE Corporation, Bellevue, WA (US)

(*) Notice: Subject to any disclaimer, the term of this patent is extended or adjusted under 35 U.S.C. 154(b) by 868 days.

(21) Appl. No.: 10/194,563

(22) Filed: Jul. 12, 2002

(65) Prior Publication Data
US 2004/0025170 A1  Feb. 5, 2004

(51) Int. Cl.
*G06F 9/45* (2006.01)
(52) U.S. Cl. ............... 717/169; 717/170; 717/171
(58) Field of Classification Search ............. 717/104, 717/105, 168, 169
See application file for complete search history.

(56) References Cited

U.S. PATENT DOCUMENTS

| | | | | |
|---|---|---|---|---|
| 5,784,643 | A * | 7/1998 | Shields ................... | 710/5 |
| 5,910,802 | A * | 6/1999 | Shields et al. ............ | 345/808 |
| 6,075,939 | A   | 6/2000 | Bunnell et al. | |
| 6,167,441 | A * | 12/2000 | Himmel ................... | 709/217 |
| 6,546,477 | B1  | 4/2003 | Russo et al. | |
| 2003/0033446 | A1* | 2/2003 | Noden ..................... | 709/328 |
| 2003/0060896 | A9* | 3/2003 | Hulai et al. .................. | 700/1 |
| 2003/0107596 | A1* | 6/2003 | Jameson ................... | 345/762 |
| 2003/0182467 | A1* | 9/2003 | Jensen et al. ............ | 709/317 |
| 2003/0200254 | A1* | 10/2003 | Wei .......................... | 709/203 |
| 2004/0268269 | A1* | 12/2004 | Breinberg ................. | 715/851 |
| 2006/0069808 | A1* | 3/2006 | Mitchell et al. ......... | 709/246 |

OTHER PUBLICATIONS

Kenny G, "A comprehensive CE class library to replace ATL and MFC", pp. 1-5, Oct. 5, 2000, retireved from google.com search Mar. 29, 2004.*
Microsoft Corporation, "Designing a Custom UI Shell for Microsoft Windows CE 3.0 Embedded Systems", pp. 1-6, Jun. 1999 retrieved from google.com search Mar. 29, 2004.*
Microsoft Corporation, "Microsoft Windows CE 3.0 Operating System Configurations", Apr. 2000, retrieved from google.com search Mar. 29, 2004.*
Adams, Margaret M., GRIB, Timothy E., A Component Based, Event Driven Framework for Rapid Prototyping Real-Time Avionics Systems, 1999 IEEE, pp. 9.C.5-1-9.C.5-8.

* cited by examiner

*Primary Examiner*—Mary Steelman
(74) *Attorney, Agent, or Firm*—Leydig, Voit & Mayer, Ltd.

(57) ABSTRACT

The present invention is directed to a system and method for utilization of applications on a device having an embedded operating system. Typically, the applications comprise third-party applications without source code. The system and method provide for the modification of the behavior and appearance of such applications and include the functionality to capture and respond to various events occurring in the applications.

19 Claims, 3 Drawing Sheets

APPLICATION MODIFICATION SYSTEM AND METHOD

TECHNICAL FIELD

The present invention relates generally to software technology. It further relates to a method and system for user interface (UI) modification and behavior modification of applications, including those applications without source code.

BACKKGROUND ART

Current technology provides for application integration in selected environments; i.e., bringing together data or a function of one application program with that of another application program. In particular, the introduction of program objects provides standard interfaces so that the so that objects designed for use in one application can be reused in other applications. Typically, this technology is available in desktop environments for specifically selected applications; i.e., software is created to extract object components or controls from a first specifically selected application such as a word processing application for recognition by a second specifically selected application such as a spreadsheet application.

Such technology, however, fails to provide for functionality derived from any third party application for utilization in a specific environment. As such, users of specific systems, such as those having embedding operating systems, are typically limited to use of the applications designed specifically for use with that device. Additionally, even if such integration means were available, the space-constrained nature of such devices further limits options in terms of market-available applications for use therewith.

What is needed, therefore, is a versatile system and method that provides the functionality necessary to use various applications, including third-party applications, within specific environments such as devices having embedded operating systems and specific delimitations. For broad application, the system and method should provide such functionality in the absence third-party application source code. Further, it is desirable for the system and method to include the functionality necessary to retain desired attributes of the third-party application while permitting modification of the user interface and/or behavioral attributes of the third-party application.

DISCLOSURE OF THE INVENTION

The present invention addresses the shortcomings of the current art by provision of a system and method for metamorphosis of third-party applications. The system and method provide the functionality to intercept and modify the behavior and appearance of third-party software applications, with or without source code (hereafter, applications). The system and method are particularly suited to environments having embedded operating systems or other space delimitations.

In one embodiment of the present invention, a method of the present invention includes the steps of capturing and responding to various events that occur in the application. The step of capturing events in the application includes detecting the start of the application; ensuring early access to window handles of interest; routing windows' messages to appropriate message handlers; intercepting at least one server library-based application programming interface (API) from the process of interest; altering parameters; providing a substitute implementation of the API; providing the functionality of at least one member of the group consisting essentially of pre-processing of the API call and post-processing of the API call. The step of responding to various events that occur in the application includes providing the functionality of at least one member of the group consisting essentially of hiding window components of an existing application; moving window components of the existing application; resizing window components of the existing application; creating a new UI; extending application features; and fixing existing application defects.

A system according to the present invention includes a starter component; a manager component; and a core component. Various embodiments also include an API hooking component. The starter component starts and initializes the system as well as dynamically associating an application and its customization dynamic-linked library (DLL) through a registration process. The manager component monitors the start up of any process and determines if the application needs to be intercepted and modified in any way (morphed). If morphing is required, then the manager component proceeds appropriately to begin the morphing process. The core component comprises various interface components to provide the core functionality described herein. In various embodiments, the API hooking component provides the functionality necessary to override system APIs, both globally and locally. Generally, the API hooking component is provided for use with X86-based systems and ARM technology or other microprocessors for cell telephones and the like.

Further advantages of the invention are brought out in the following portions of the specification, wherein the detailed description is for the purpose of fully disclosing preferred embodiments of the invention without placing limitations thereon.

MODES FOR CARRYING OUT THE INVENTION

The present invention provides the functionality necessary to utilize third-party applications, with or without source code, on a device having an embedded operating system. The method and system of the present invention capture and modify such applications, including transformation of their appearance and behavioral aspects. In a preferred environment, the method and system are utilized in conjunction with an environment having the Windows CE® operation system, typically including COM, ATL, GWES, and GDI components. It is contemplated that the components of the present invention will be utilized in a trusted environment; however, it is possible to include the components in a Bin (binary) file or the like. A skilled artisan will note that the present invention contemplates various arrangements and selections of components, environments, platforms and the like, so long as the functionality described herein is accomplished.

In the preferred embodiment, the starter component is encoded as Morpheus.exe, the only executable of present invention. The manager component is encoded as MorphMgr.dll, and is run as a module in GWES.exe. The API hooking component comprises CliHook.dll, which provides a means to hook any PSL (Protected Server Library) API and SrvHook.dll, a server part to be used implicitly by CliHook.dll. The core component comprises Morpheus.dll, the main component of the preferred embodiment, and consists of MOM (Morpheus Object Model). Various embodiments also comprise CustomDll, which uses MOM to modify or implement the user interface. Each customized DLL is specifically tailored for an individual application. Each of the aforementioned components of the present invention is hereafter described in detail.

Figure 1:
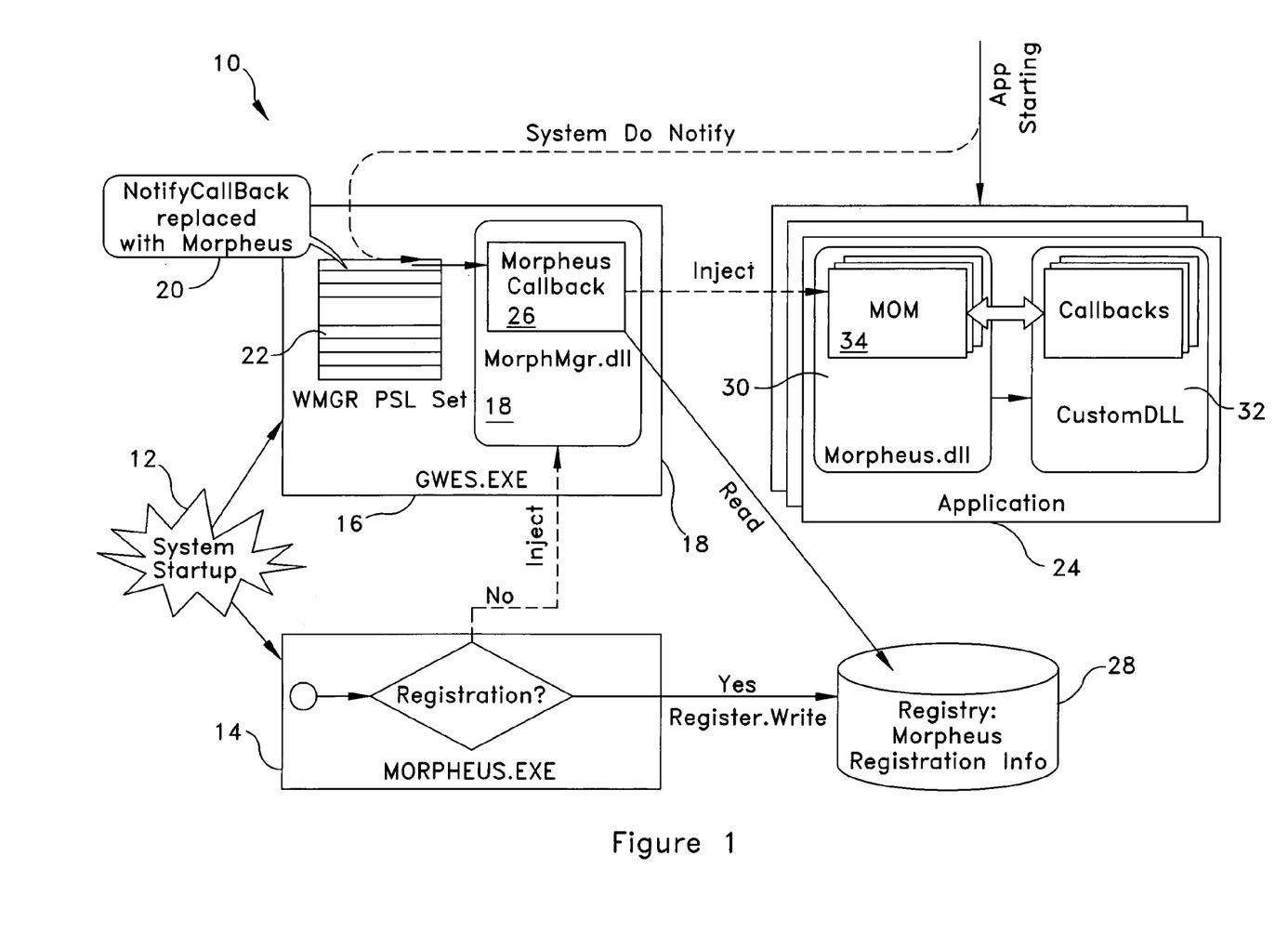
FIG. 1 illustrates an architectural schematic of a system according to the present invention.

Referring now to the drawings, wherein like elements are referenced using the same numeral, and with reference to FIG. 1, there is shown generally at 10 the architecture of a system of the present invention, wherein the system startup 12 launches Morpheus.exe 14 after Gwes.exe 16. Morpheus.exe 14, in turn injects MorphMgr.dll 18 into the Gwes.exe 16. MorphMgr.dll's 18 DllMain component (not shown) is invoked with DLL_PROCESS_ATTACH. MorphMgr.dll 18 creates a new thread to hook NotifyCallback function 20 in WMGR PSL Set 22, which is the first entry in the table. Morpheus.exe 14 finishes and exits. When the application 24 starts up, the system invokes the NotifyCallback 20 entry. MorphMgr 18 catches this call with Morpheus Callback 26 and determines if the application 24 is registered to be morphed. If the registry 28 contains the registered information, then MorphMgr18 injects Morpheus.dll 30 into the application 24. An initialization function, exported in Morpheus.dll 30 is called. Morpheus.dll 30 then loads the CustomDll 32 and invokes MorpheusMain, the required exported function in every customized DLL. CustomDll 32 begins modifications of the UI of application 24 through MOM 34.

The starter component, Morpheus.exe, performs two functions: starting and initializing the system at system boot as well as dynamically associating an application and its customization DLL through the registration. Typically, there is no graphical user interface for this component, nor do users interact with it. The command line parameters are parsed to determine the associated actions. An example of a command line interface and its parameters are listed as follows:

---
Morpheus.exe [-e <application.exe> [-m <customization.dll>]]
    -e Full path of application to be registered/unregistered
    -m if -m is missing, Morpheus deregisters the
        <Application.exe>; otherwise, Morpheus registers the
        <Application.exe> to be morph-ed by
        < customization.dll>
---

If no parameter is entered, Morpheus.exe attempts to initialize the system of the present invention. Initialization is mostly likely accomplished at system boot, through registry setup. The application and customization DLL paths are checked to ensure the EXE or DLL exists in the system. An example of the registry entry in project.reg file at system boot is:

---
[HKEY_LOCAL_MACHINE\init]
"Launch40" = "Morpheus.exe"
"Depend40" = hex: 14,00, 1e,00
---

Launch order can be changed, but it must be launched after Gwes.exe and before Explorer.exe. To ensure Explorer.exe is started after the Morpheus.exe, the registry entry in wceshellfe.reg must be modified at the "Depend50" line to:

"Depend50"=hex:14,00, 1e,00, 28,00

To start and initialize the system of the present invention, the starter component; e.g., Morpheus.exe performs the following steps: creates a named event "MorpheusStarted"; gets the Gwes.exe process handle; injects MorphMgr.dll to Gwes with the handle obtained previously through an InjectDll function (described below); waits for named event to be signaled; calls SignalStarted; and exits the process. The InjectDll function is accomplished by using an API in Window CE® similar to the CreateRemoteThread API in desktop Windows®. Instead of creating a new thread in a remote process, this API migrates the current calling thread over to the destination process and executes the specified function pointer in the address space of the remote process. In the present invention, for example the LoadLibrary could be specified as the function pointer. As such, the DLL can be loaded in the remote process. Morpheus.exe uses Registry to keep the registration data. The following is where the data is kept and its format:

---
[HKEY_LOCAL_MACHINE\Software\BSQUARE\Morpheus]
"<FullPathExeName>" = "-m <FullPathCustomDLL>"
---

The path of exe is stored in with all backward slashes ('\') replaced with forward slashes ('/') and all converted to lower cases. In various embodiments, the command line can be used to dynamically add and remove the registration of an application. Morpheus.exe can run at anytime after the device is booted. If at the boot time Morpheus.exe is already started up, the running Morpheus.exe with no parameters causes a dialog pop up warning that other instances of Morpheus are already running. Morpheus then exits after displaying the dialog. All parameters are checked. An invalid filename causes the registration to fail with appropriately displayed messages. The order of parameters is not important; e.g., the –m can go before –e.

The manager component; e.g., Morpheus Manager, is implemented in MorphMgr.dll and monitors the start up of any process. After start up, MorphMgr.dll checks with the registration information to see if the application needs to be morphed. If so, Morpheus Manager injects the Morpheus.dll into the application and remotely invokes the initialization function exported in Morpheus.dll with appropriate parameters to startup the "morphing". There is no user interface associated with this component.

Figure 2:
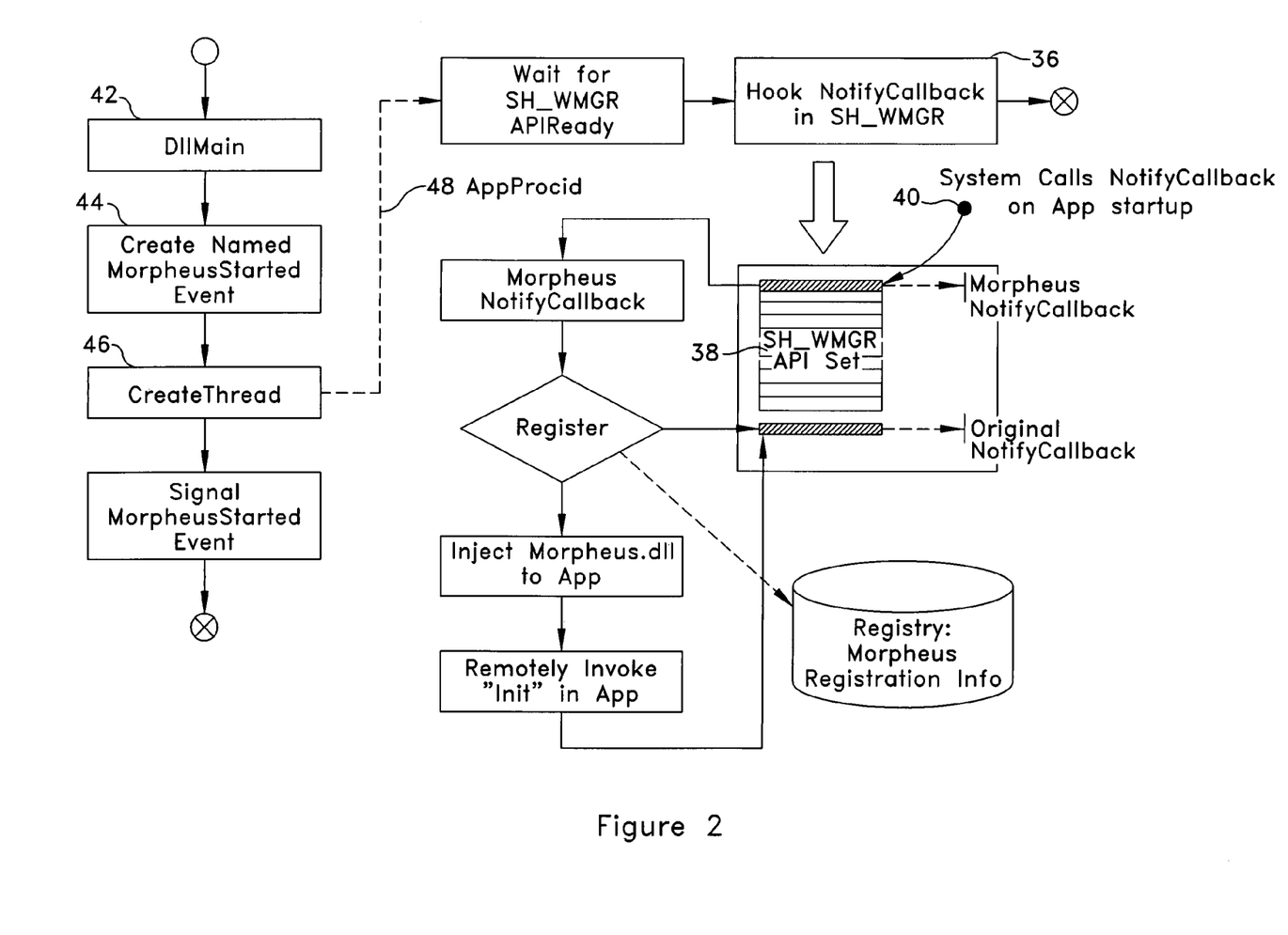
FIG. 2 illustrates a schematic of the manager component process according to the present invention.

Turning now to FIG. 2, there is shown a schematic of the manager component-related processes. To monitor for the start of a process, Morpheus Manager hooks into the NotifyCallback 36 entry of SH_WMGR APISet 38 in Gwes.exe. When a process starts up, the system does a NotifyCallback 36 to every APISet by calling the function pointer in the first entry of the APISet (shown at 40). Thus, when DllMain is invoked 42, it creates a named event 44, MorpheusStarted and a thread 46, whereafter the manager component monitors for the start of the process 48. The tasks involved in the hooking process are further detailed with reference to API Hooking Component, including its CliHook and SrvHook There is no user interface associated with the manager component.

The API Hooking Component is used in conjunction with X86 microprocessors, ARM microprocessors and the like. The API Hooking Component provides a powerful way to override system APIs either globally or locally. This component comes with two DLLs, CliHook.dll and SrvHook.dll.

An application can choose to override any API that is provided through the PSL mechanism by simply using the exported functions in CliHook.dll. SrvHook.dll is a "behind the scene" component that is interfaced by CliHook.dll. CliHook exports the following are functions:

```
BOOL SetAPIHook
              (
                        BYTE bApiSet,
                        WORD uApiIndex,
                        PFNVOID pfnHookProc,
                        PFNVOID* ppfnOrigProc,
              ) DWORD fHookProcess
bApiSet             The APISet index which contains the API to be hooked
uApiIndex           The API index in the APISet, specified by bApiSet, of the
                    API to be hooked.
pfnHookProc         The hook procedure. This procedure must have the same
                    signature as the hooked API.
ppfnOrigProc        The address of function pointer will be filled with address
                    the original API procedure. This can be NULL. Client
                    should not attempt to call this function directly as it can
                    resign in different process.
fHookProcess        A masked DWORD indicates the process to be hooked.
                    fHookProcess = 0, only current process is hooked;
                    fHookProcess = -1, all processes are hooked; the bit x is
                    set, the process with index x is hooked. Client can set
                    multiple bits to hooked API from multiple processes. If
                    fHookProcess is not 0, client must set the corresponding
                    bit if it wants its own process to be hooked. If the other
                    process already hooked a same API in the same process
                    specify by fHookProcess that API will not be hooked by
                    this process. The corresponding bit in fHookProcess is
                    ignored.
                    In Windows CE, processes index are from 1 to 32. So the
                    bit set is always 1 less the process index. For example, to
                    hook process with index 6 you would have to set the bit
                    5; to hook process with index 9 you would have to set the
                    bit 8.
Remark:             bApiSet and uApiIndex of most WindowsCE API can be
                    found from header files in
                    %_WINCEROOT%\public\common\oak\inc\.
BOOL RemoveAPIHook
              (
                        BYTE bApiSet,
                        WORD uApiIndex,
              ) DWORD fHookProcess
bApiSet             The APISet index which contains the API to be hooked
uApiIndex           The API index in the APISet, specified by bApiSet, of the
                    API to be hooked.
fHookProcess        A masked DWORD indicates the process to be unhooked.
                    fHookProcess = 0, only current process is unhooked;
                    fHookProcess = -1, all processes are unhooked; the bit x
                    is set, the process with index x is unhooked. Client can
                    set multiple bits to unhooked API from multiple
                    processes.
Remark:             bApiSet and uApiIndex of most WindowsCE API can be
                    found from header files in
                    %_WINCEROOT%\public\common\oak\inc\.
BOOL SetThreadHookOption
              (
                        BOOL bHookBypass,
                        BOOL bAutoReset
              )
bHookBypass         TRUE, the hooked APIs will not be hooked if originates
                    from this thread. FALSE, bypass status is removed.
bAutoReset          TRUE, bypass status is removed as soon as the first
                    bypass happens.
                    FALSE, thread must call SetThreadHookOption to reset
                    the bypass option.
Remark:             Thread can use this option to permanently/temporarily
                    turn off API hooking. Thread can use this function to
                    make the "real" API call.
```

The CliHook.dll interacts with the client of this component. CliHook.dll can be loaded by any process, either implicitly or explicitly. Once it is exported functions are invoked, CliHook.dll checks whether the appropriate SrvHook.dll is being loaded in the server process, based on the bApiSet parameter. If not, CliHook.dll injects SrvHook.dll to that sever process. Through the window messaging system, CliHook.dll will submit a request to SrvHook.dll to perform the service. Messages formatted from CliHook.dll to SrvHook.dll follow. All CliHook.dll share an array of 32 HWNDs to keeps HWND of Server-HookWindow in the PSL Server. HWND will be stored at the same index as the PSL server process index. Write access to this table is protected by a mutex (mutual exclusion object) of the name ServerHWNDTlbMutex. If HWND is not in the Table, the SrvHook.dll is not loaded in the server. Sharing is done by #prama "Shared". Complete syntax is as follows:

```
#pragma data_seg("CliHook")
HWND g_rgSeverHWND[MAX_PROCESS];
#pragma data_seg()
#pragma comment(linker, "/section:CliHook,rws")
```

All CliHook.dll instances must create their own mutex of the same name. If the creation mutex does not generate ERROR_ALREADY_EXISTS, CliHook must enter the mutex then initialize the share table of HWND. The following are structs (structures) used in the communication between CliHook and SrvHook:

```
typedef struct _SRVINITINFO
{
    UINT    uProcIndex;   //current processIndex, the process load CliHook
    UINT    uTlsTOIndex   //TLS index used to store Hook Option.
}SRVINITINFO, *PSRVINITINFO;
typedef struct _APIHOOKINFO
{
    UINT    uProcIndex;
    BYTE    bApiSet;      //Api Set which contains API to be
                          Hooked
    UINT    uApiIndex;    //Index in the set of API to be Hooked
    DWORD   fHookProc;    //Dword masked of process to be hook
    PFNVOID pfnHookProc;
}APIHOOKINFO, *PAPIHOOKINFO;
```

The following are data types that are used for dwData:

```
HD_INITCLI          0x00000000   Init server with client
HD_DEINITCLI        0x00000001   Deinit Server with client
HD_SETAPIHOOK       0x00000002   SetApiHook
HO_REMOVEAPIHOOK    0x00000003   RemoveApiHook
```
Init SrvHook.dll with this instance of CliHook.dll
uMsg = WM_COPYDATA
    hWnd    HWND created by SrvHook.dll per Server process. The
                Window Name is based on the strip down server module
                name. For example,
                GWES.EXE would have the window with the caption of
                GWES_ServerHookWindow.
    wParam  NULL.
    lParam   PCOPYDATASTRUCT
                      dwData  HD_INITCLI
                      cbData   sizeof(PSRVINITINFO)
                      lpData   pSrvInitInfo
    Return Value  TBD
Remark:
Deinit SrvHook.dll with this instance of CliHook.dll
uMsg = WM_COPYDATA
    hWnd    HWND created by SrvHook.dll per Server process. The
                Window Name is based on the strip down server module
                name. For example,
                GWES.EXE would have the window with the caption of
                GWES_ServerHookWindow.
    wParam  NULL.
    lParam   PCOPYDATASTRUCT
                      dwData  HD_DEINITCLI
                      cbData   sizeof(PSRVINITINFO)
                      lpData   pSrvInitInfo
    Return Value  Return TRUE if successfully deinit. False otherwise.
Remark:
Hook new API request.
uMsg = WM_COPYDATA
    hWnd    HWND created by SrvHook.dll per Server process. The
                Window Name is based on the strip down server module
                name. For example,
                GWES.EXE would have the window with the caption of
                GWES_ServerHookWindow.
    wParam  NULL.
    lParam   PCOPYDATASTRUCT
                      dwData  HD_SETAPIHOOK
                      cbData   sizeof(PAIHOOKINFO)
                      lpData   pApiHookInfo
    Return Value  The address of the original API if successful.
                    CLI_NOTINIT if client has not been 'registered' -
                    through HD_INITCLI.
                    CLI_NOTINIT = 0x80000000. Or NULL if Failed -continued

```
Remark:
To Unhook the API
uMsg = WM_COPYDATA
        hWnd    HWND created by SrvHook.dll per Server process. The
                Window Name is based on the strip down server module
                name. For example,
                GWES.EXE would have the window with the caption of
                GWES_ServerHookWindow.
        wParam  NULL.
        lParam  PCOPYDATASTRUCT
                        dwData   HD_REMOVEAPIHOOK
                        cbData   sizeof(PAIHOOKINFO)
                        lpData   pApiHookInfo
        Return  Return TRUE if successful else FALSE. CLI_NOTINIT
        Value   if client is never initialized through HD_INITCLI.
Remark:
```

The CliHook.dll handles SetThreadHookOption internally. To handle this function, CliHook.dll allocates a TLS index when DLLMain is call with DLL_PROCESS_ATTACH. This entry is initialized to 0 whenever DLL_THREAD_ATTACH is called. Since TLS is also migrated with the thread to other process, when the thread making the PSL call SrvHook will check this TLS entry to fine out the bypass option in this thread. Following is the format of the DWORD stored in this TLS:

```
HO_NOBYPASS       0x00000000   No bypassing option is set.
HO_AUTOBYPASS     0x00000001   Bypass with auto reset.
HO_MANUALBYPASS   0x00000002   Bypass with manual reset
```

With regard to accessing the system API table, the address is mapped to: (CINFO**)UserKInfo[KINX_APISETS].

Figure 3:
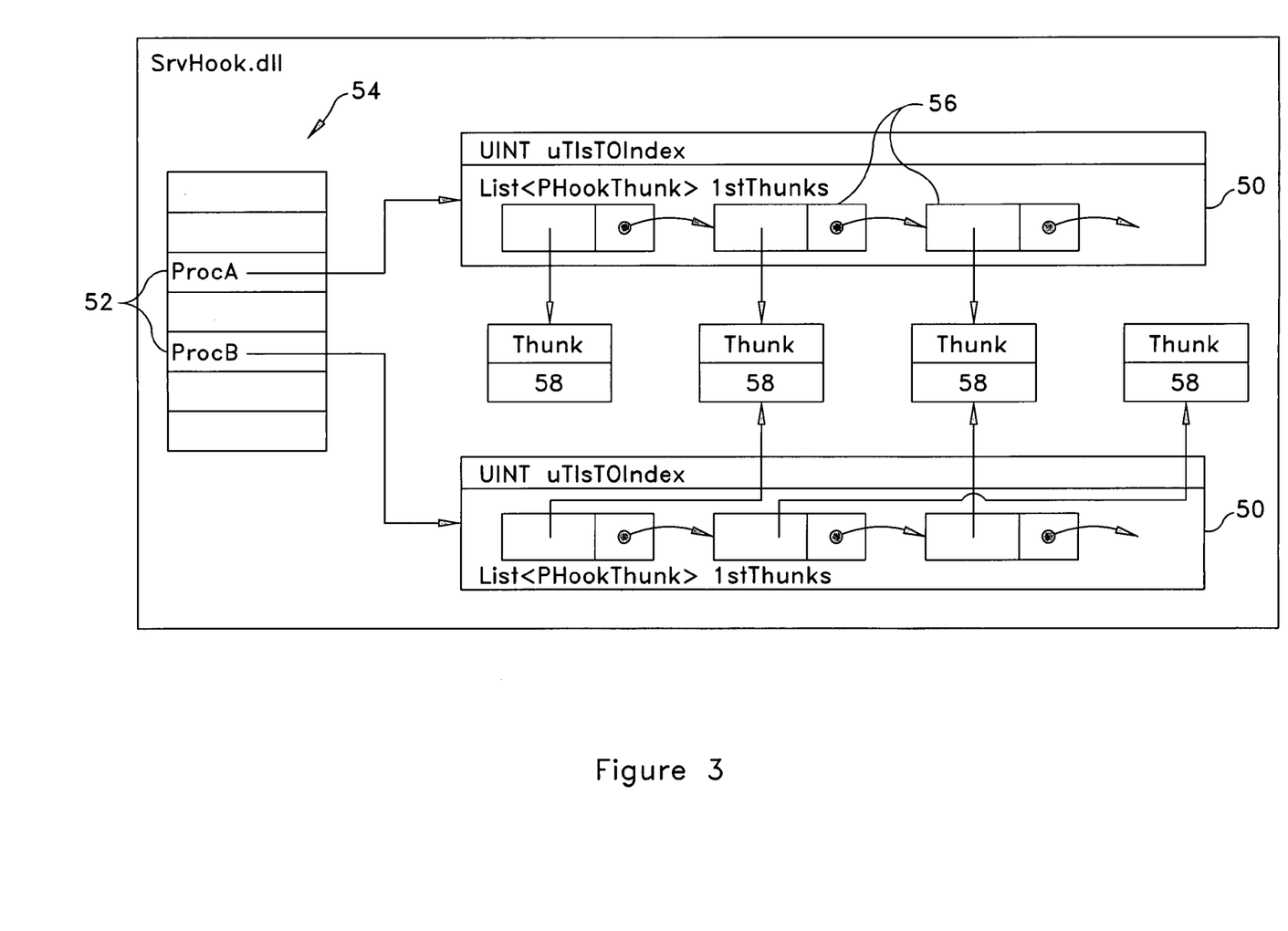
FIG. 3 illustrates a schematic of the SrvHook.dll process according to the present invention.

With reference now to FIG. 3, there is shown a schematic of the internal data structure of SrvHook.dll. All instances of SrvHook share an array 50 of 32 entries, one for each client process 52 identified by its process index 54. Each entry is a pointer 56 of PCLIINFO type. Below is the definition of PCLIINFO.

```
typedef struct tagCLIINFO
{
    UINT       uTlsTOIndex;
    HANDLE     hProcess;
    List <PHOOKTHUNK> 1stThunks;
}CLIINFO, *PCLIINFO;
PHOOKTHUNK is defined as following:
class CLHOOKTHUNK
{
public:
    BYTE       m_bApiSet;
    UINT       m_uApiIndex;
    // m_rgHkedbyProc stores the process index of the client process
    // who requesting the hook from another process whose index is the
    // index to the array. For example, Process index 5 wants to hook
    // an API which are called from process 2 then
    m_rgHkeybyProc[2-1]
    // would have the value of 5. Another example, if Process index 5
    // wants to hook an API which are called from processes 5, 7, and 9
    // then all m_rgHkeybyProc[5-1], m_rgHkeybyProc[7-1], and
    // m_rgHkeybyProc[9-1] would have the value of 5.
    BYTE       m_rgHkedbyProc[MAX_CE_PROCESSES];
    // m_rgpfnAlt stores the address of the replaced API at the index
    // of the process index. For example, process 5 wants to hook an
    // API then its replaced API is stored at m_rgpfnAlt[5-1]
    PFNVOID    m_rgpfnAlt[MAX_CE_PROCESSES];
    //Dont add in between or change order of the following 2 members.
    CHOOKTHUNK* m_pthis;
    _Thunk     thunk;
    CHOOKTHUNK(BYTE bApiSet, UINT uApiIndex);
    BOOL SetHook(PFNVOID pfnHookFunc, UINT uProcOwner,
           DWORD fHookProc);
    BOOL RemoveHook(UINT uProcOwner, DWORD fFlookProc);
};
typedef CHOOKTHUNK* PHOOKTHUNK;
```

_Thunk 58 is a struct of self-modifying code, thus it is platform dependent; e.g., ARMV4 and X86 are supported. The address of this thunk will replace the function address of the actual API in the API table when the API is hooked. When a hooked API is called by the OS, the associated thunk is invoked instead. The thunk itself performs a jump to a GenericProxy with a pointer 56 to its HOOKTHUNK struct. GenericProxy is also a platform dependent code. Base on HOOKTHUNK data which passed to by the Thunk 58, GenericProxy will decide whether to call and how to call a hooked function or just simply call the actual API.

CliHook.dll is responsible for loading/injecting SrvHook.dll to appropriate PSL server. In DllMain, on DLL_PROCESS_ATTACH, SrvHook.dll creates a thread that will be responsible for handling Window Message sent from CliHook.dll. The new thread creates a window with the caption of the format "xxx_ServerHookWindow" and a Thread Enter message pump.

A number of associated messages are detailed as follows.

On WM_DATACOPY with dwData=HD_INITCLI:
The client sends this message to initialize its instance with the Server. The client can send this message anytime to reset. Typically this message is sent before the first request to Sever from the client.

On WM_DATACOPY with dwData=HD_DEINITCLI:
Client sends this message to de-initialize and remove all API hooks associated with the client process. Client can send this message anytime. This message is typically sent when client DLL is detaching from the client process; i.e., when DllMain is called with DLL_PROCESS_DETACH.

On WM_DATACOPY with dwData=HD_SETAPIHOOK:
Client sends this message to request hooking a particular API. Any number of clients can request hooking the same API as long as the fHookProc is not already specified by previous hook request. Server will make sure only one HOOKTHUNK is created per API regardless the number of client process.

If the API is not hooked by any process, a HOOKTHUNK struct is created. The Thunk is then built and its address replaces the address of the API in the System API table. Internal data of HOOKTHUNK are initialized to record the address of the replaced function and the process from which it originates. The address of the HOOKTHUNK is then added to a list of the client process information for maintenance reason. (See FIG. 3 above).

If the API is already hooked by another process, the HOOKTHUNK struct is retrieved. Additional data is added to internal data of the HOOKTHUNK to record information of the new hook request. The address of the HOOKTHUNK is also added to the list of current client process information.

On WM_DATACOPY with dwData=HD_REMOVEAPIHOOK:

The HOOKTHUNK of the API is retrieved. m_rgHkedbyProc and m_rgpfnAlt array are updated to reflect the request. If there is no other Process hooked by this Client then the HOOKTHUNK reference is removed from list of client process information. If there is no other Process is being hooked and no other process wants to hook this API, then the original API address is restored to the System API table and the HOOKTHUNK struct is deleted.

Although this component is designed to run in conjunction with the remaining components, this component also runs independently of the same. As such, any application can use this component by simply calling the exported functions of CliHook.dll. The ability trap any API call in the system is a very effective and powerful way to "embrace and extend" the window architecture. It provides a unique way to modify the behavior of any existing application. In essence, the system of the present invention can be one of its applications.

The principle functionality of the system resides in the core component; i.e., Morpheus.dll, which contains various COM-based interfaces. In various embodiments, the following interfaces are utilized:

User Interfaces:

The application interacts with the system through MOM and Window Sub-Classing interfaces.

| | Window Sub-Classing Interfaces: | | |
|---|---|---|---|
| IMorpheusFactory:Iunknown | | | |
| Attach WindowHWND | HRESULT | HWND hWnd, [out, retval]LPUNKNOWN* ppUnkWin | |
| AttachWindowId | HRESULT | [in] LONG windowId, [in] HWND oWindowParent, [out, retval] LPUNKNOWN* ppUnkWin | |
| AsyncAttachWindowId | HRESULT | [in] LONG windowId, [in] HWND oWindowParent, [in] VARIANT vtCallbackFunc, [in, defaultvalue(0)] ULONG ulUserData, [out, retval] ULONG* puAttachId | |
| AttachWindowName | HRESULT | [in] LPTSTR lpCaption, [in] LPTSTR lpClassName, [out, retval] LPUNKNOWN * ppUnk Win | |
| AsyncAttachWindowName | HRESULT | [in] LPTSTR lpCaption, [in] LPTSTR lpClassName, [in] VARIANT vtCallbackFunc, [in, defaultvalue(0)] ULONG ulUserData, [out, retval]ULONG* puAttachId | |
| CancelAsyncAttach | HRESULT | [in] ULONG uAttachId | |
| ObjectProducer | HRESULT | [in] IUnknown* oWindow, [out, retval] LPUNKNOWN* pObjectProducer | |
| IEnumWindow:Iunknown | | | |
| Lock | HRESULT | Void | |
| Unlock | HRESULT | Void | |
| Reset | HRESULT | Void | |
| Count | HRESULT | [out, retval] UINT* puCount | |
| Next | HRESULT | [out, retval] HWND* phWnd | |
| Skip | HRESULT | UINT uNumItem | |
| IStealthWindow:Iunknown | | | |
| SubscribeMsg | HRESULT | ULONG uMsg, ULONG wParam, ULONG lParam, VARIANT vtCallback, [in, defaultvalue (0)] ULONG lUserData | |
| UnsubscribeMsg | HRESULT | ULONG uMsg, ULONG wParam, ULONG LParam | |
| GetHWND | HRESULT | [out, retval] HWND *phWnd | |
| ChildWindows | HRESULT | [out] IEnumWindow** oEnumWindow | |
| SiblingWindows | HRESULT | [out] IEnumWindow** oEnumWindow | |
| | Bitmap based User Interface and Utility interfaces: | | |
| IObjectProducer:Iunknown | | | |
| NewObject | HRESULT | [in] UINT nObjId, [out, retval]LPUNKNOWN* pDispObj | |
| RemoveObject | HRESULT | [in] iUnknown* pDispObj | |

-continued

Window-based MOM:

IStaticBitmap:IUnknown

| | | |
|---|---|---|
| Config | HRESULT | ITileImgList* pbt |
| GetDestRect | HRESULT | PRECT pDestRect |
| Show | HRESULT | BOOL bShow, PRECT pDestRect |

IStaticText:IUnknown

| | | |
|---|---|---|
| Config | HRESULT | LPTSTR lpText, COLORREF crfFore = 0, DWORD fTextAlign = DT_BOTTOM\|DT_CENTER\|TX_CLIPPED, IFont* pFont = NULL, ITileImgList* pbmBgrd = NULL |
| Show | HRESULT | BOOL bShow, PRECT pDestRect |
| GetDestRect | HRESULT | PRECT pDestRect |

ILink:IUnknown

| | | |
|---|---|---|
| Config | HRESULT | ICommand* pCmd, LPTSTR lpText, DWORD ffextAlign = DT_BOTTOM\|DT CENTER\| TX_CLIPPED, COLORREF crfFore[4] = NULL, IFont* pFont = NULL, ITileimgList* pbmBgrd = NULL |
| GetCommand | HRESULT | ICommand** ppCmd |
| SetCommand | HRESULT | ICommand* pCmd |
| Show | HRESULT | BOOL bShow, PRECT pDestRect |
| GetDestRect | HRESULT | PRECT pDestRect |
| SetFocus | HRESULT | [in]BOOL bFocus |
| Select | HRESULT | [in]BOOL bSelect |

IButton:IUnknown

| | | |
|---|---|---|
| Config | HRESULT | ICommand* pCmd, ITileIcon* ptiIcon, LPTSTR lpCaption, DWORD fIconAlign = DT_TOP\|DT_CENTER, DWORD fCaptionAlign = DT_VCENTER\|DT_CENTER\|TX_CLIPPED, DWORD fBtnStyles, COLORREF crFore[4], IFont* pFont = NULL, ITileImgList* ptilBgrd = NULL |
| SetKbAccel | HRESULT | LPACCEL pAccelObj |
| SetToolTip | HRESULT | LPTSTR ipToolTips |
| GetCommand | HRESULT | ICommand** ppCmd |
| SetCommand | HRESULT | ICommand* pCmd |
| Show | HRESULT | BOOL bShow, PRECT pDestRect |
| GetDestRect | HRESULT | PRECT pDestRect |
| SetBtnStates | HRESULT | DWORD fBtnState |
| GetBtnStates | HRESULT | [out]DWORD* pfBtnStates |

Non-Window-Based MOM

IMomFont: IUnknown

| | | |
|---|---|---|
| Init | HRESULT | [in]LPCTSTR lpFontName, [in] LONG ifHeight, [in]LONG lfWeight |
| Delete | HRESULT | Void |
| GetFont | HRESULT | [out]HFONT* phFont |
| SelectDC | HRESULT | [in]HDC hdc |
| DeselectDC | HRESULT | Void |

ICommand:IUnknown

| | | |
|---|---|---|
| MessageCmd | HRESULT | [in] ULONG hWnd, [in] WPARAM wParam, [in, defaultvalue(NULL)] LPARAM lParam, [in, defaultvalue(WM_COMMAND)] UINT uMsg |
| CallbackCmd | HRESULT | [in] VARIANT vtCallback, [in] LPARAM lParam |
| Execute | HRESULT | Void |

IImageLdr:IUnknown

| | | |
|---|---|---|
| Init | HRESULT | LPTSTR strFileName |
| InitResId | HRESULT | ULONG hInstance, UINT uResId |
| Size | HRESULT | PSIZE pSize |
| MaskColor | HRESULT | COLORREF* pcrfMask |
| TileImgList | HRESULT | [in]ITileImgList** pTil, [in]PRECT pImgRect, [in]DWORD fOptions, [in, defaultvalue(1)]UINT uImgCount |

-continued

| ITileImgList:IUnknown | | |
|---|---|---|
| Config | HRESULT | IImageLdr* pImg, PRECT pImgRect, DWORD fOptions, UINT uImgCount = 1 |
| SetTileGrid | HRESULT | PRECT pGridRect |
| Draw | HRESULT | HDC hdc, PRECT pDestRect, UINT uImgNumber = 0 |
| SetImgListRect | HRESULT | PRECT pImgRect |
| GetImgListRect | HRESULT | PRECT pImgRect |
| GetImgSize | HRESULT | [out]SIZE* pSize |
| IPanel:IUnknown | | |
| Config | HRESULT | PPOINT ptOrigin, DWORD fOptions, PRECT pMaxRect, ITileImgList* ptilBgrd |
| AddObject | HRESULT | IUnknown* pObject, SIZE sObject, BOOL bShow, UINT *puObjIndex |
| RemoveObject | HRESULT | UINT uObjIndex |
| ObjectToIndex | HRESULT | IUnknown* pObject, UINT* puObjIndex |
| Count | HRESULT | UINT uObjCount |
| Show | HRESULT | BOOL bShow |

A method of the present invention includes the steps of detecting the start of the application; ensuring early access to window handles of interest; routing windows' messages to appropriate message handlers; intercepting at least one server library-based application programming interface (API) from the process of interest; altering parameters; providing a substitute implementation of the API; and providing the functionality of at least one member of the group consisting essentially of pre-processing of the API call and post-processing of the API call.

Having illustrated and described the principles of the system and method of the present invention in various embodiments, it should be apparent to those skilled in the art that the embodiment can be modified in arrangement and detail without departing from such principles. For example, the code format and structure may be changed if preferred. Therefore, the illustrated embodiments should be considered only as example of the invention and not as a limitation on its scope.

INDUSTRIAL APPLICABILITY

The present invention addresses the shortcomings of the current art by providing a system and method for metamorphosis of third-party applications. The system and method provide the functionality to intercept and modify the behavior and appearance of third-party software applications, with or without source code (hereafter, applications). The system and method are particularly suited to environments having embedded operating systems or other space delimitations. In light of the foregoing, it is contemplated that the present invention will prove highly marketable to consumers in various venues, particularly those seeking the technical functionality and features provided in the invention.

SCOPE OF THE INVENTION

Although the description above contains much specificity, it should not be construed as limiting the scope of the invention but as merely providing illustrations of some of the presently preferred embodiments of this invention. Thus the scope of this invention should be determined by the appended claims and their legal equivalents. Further, it is appreciated that the scope of the present invention encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claim. No claim element herein is to be construed under the provisions of 35 U.S.C. 112, sixth paragraph, unless the element is expressly recited using the phrase "means for".

What is claimed is:

1. A method for performing metamorphosis of an application associated with a device having an embedded operating system, the method comprising the steps of:
   receiving manual input parameters to dynamically register the application for the metamorphosis by modifying the registry using said input parameters;
   capturing one or more events that occur in the application running on the embedded operating system;
   responding to the one or more events that occur in the application; and
   transforming at least one feature of the application, wherein the at least one feature modifies a behavioral functionality of the application;
   detecting the start of the application;
   ensuring access to window handles of interest;
   routing window messages to appropriate message handlers;
   intercepting at least one server library-based application programming interface from a process of interest;
   altering at least one function address parameter for the application programming interface;
   providing a substitute implementation of the application programming interface; and providing the functionality of at least one member of the group consisting of pre-processing of the application programming interface call and post-processing of the application programming interface call.

2. The method of claim 1, wherein the step of responding to the one or more events that occur in the application further comprises the steps of:
provaging the functionality of at least one member of the group consisting of hiding at least one existing window component of the application;
moving at least one existing window component of the application;
resizing at least one existing window component of the application;
creating a new user interface;
extending at least one feature of the application; and
fixing at least one existing defect in the application.

3. The method of claim 1 wherein the at least one feature modifies a user interface functionality of the application.

4. A method for metamorphosis of an application on a device having an embedded operating system, the method comprising the steps of:
receiving manual input parameters to dynamically register the application for the metamorphosis by modifying the registry using said input parameters;
detecting a start of the application;
ensuring access to window handles of interest;
routing window messages to appropriate message handlers;
intercepting at least one server library-based application programming interface from a process of interest;
altering at least one function address parameter for the application programming interface; providing a substitute implementation of the application programming interface; providing functionality for pre-processing of the application programming interface call; providing functionality for post-processing of the application programming interface call;
hiding at least one existing window component of the application; moving at least one existing window component of the application; resizing at least one existing window component of the application; creating a new user interface;
extending at least one feature of the application; and
fixing at least one existing defect in the application.

5. A system for metamorphosis of at least one feature of an application running on a device having an embedded operating system, the system comprising:
a processor,
memory having thereon computer readable instructions for
(a) receiving manual input parameters for dynamically associating the application with a customization dynamic a starter component by modifying the registry using said input parameters;
(b) monitoring, via a manager component, a start up of the application and determining whether the at least one feature of the application needs to be transformed;
(c) transforming the at least one feature of the application in the memory via a core component; and
wherein the at least one feature is adapted to modify at least one behavior of the application in the memory and the starter component is adapted to start and initialize at least the manager component.

6. The system of claim 5, wherein the computer readable instructions further include overriding at least one computer system application programming interface via an application programming interface hooking component, the application programming interface hooking component associated with the core component.

7. The system of claim 6, wherein the application programming interface hooking component further comprises at least one member of the group consisting of CliHook.dll and SrvHook.dll.

8. The system of claim 5, wherein the starter component is adapted to (a) start and initialize the system at the embedded operating system initialization, and (b) dynamically associate the application and the customization dynamic-linked library through registration.

9. The system of claim 5, wherein the core component further comprises at least one interface.

10. The system of claim 9, wherein the at least one interface further comprises sub-classing interfaces.

11. The system of claim 9, wherein the at least one interface further comprises bitmap-based interfaces.

12. The system of claim 9, wherein the at least one interface further comprises utility interfaces.

13. The system of claim 9, wherein the at least one interface further comprises window-based morpheus object model.

14. The system of claim 9, wherein the at least one interface further comprises at least one non-window-based morpheus object model.

15. The system of claim 5 wherein the at least one feature is adapted to modify a user interface of the application.

16. A system for metamorphosis of an application running on a device having an embedded operating system, the system comprising:
a start and initialization component for use at system initialization;
a dynamic association component for receiving manual input parameters for association of the application and its customization DLL through a registry entry, modified using said input parameters, the dynamic association component associated with the start and initialization component
a monitor component for monitoring startup of the application, the monitor component associated with the dynamic association component,
a determination component for determining if the application needs to be metamorphosed, the determination component associated with the monitor component;
at least one interface for providing modification functionality for the application, the at least one interface associated with the determination component;
an application programming interface hooking component for overriding at least one computer system application programming interface, the application programming interface hooking component associated with the at least one interface; and
wherein the a least one interface is adapted to transform at least one behavior of the application in a memory of the device.

17. The system of claim 16, wherein the at least one interface further comprises at least one member selected from the group consisting of a bitmap-based interface; a sub-classing interface; a window-based morpheus object model and a non-window based morpheus object model.

18. The system of claim 16, wherein the programming interface hooking component further comprises at least one component selected from the group consisting of the CliHook.dll and Srvhook.dll.

19. The system of claim 16 wherein the at least one feature is adapted to modify a user interface of the application.

* * * * *